United States Patent Office 3,355,473
Patented Nov. 28, 1967

3,355,473
HYDROXYORGANOSILANES
Harold A. Clark and Loren A. Haluska, Midland, Mich., assignors to Dow Corning Corporation, Midland, Mich., a corporation of Michigan
No Drawing. Original application Apr. 1, 1963, Ser. No. 269,781, now Patent No. 3,317,460, dated May 2, 1967. Divided and this application Dec. 21, 1966, Ser. No. 603,416
9 Claims. (Cl. 260—448.2)

ABSTRACT OF THE DISCLOSURE

Hydroxyorganosilanes of the formula $$[(HO)_cR]_bSiR'_a$$

wherein R is a trivalent or tetravalent hydrocarbon or hydrocarbon ether radical bonded to the silicon atom via a silicon-carbon bond, R' is a monovalent hydrocarbon radical free of aliphatic unsaturation, $a$ is 2 to 3, $b$ is 1 or 2, $c$ is 2 or 3, and all of the hydroxyl groups are primary hydroxyl groups, are claimed.

---

This application is a division of our application Ser. No. 269,781, filed April 1, 1963, which is now U.S. Patent No. 3,317,460.

This invention relates to new silanes.

The silanes of this invention are useful as curing agents for isocyanate prepolymers, for preparing polyurethane rubbers and for making varnishes.

This invention also relates to silanes of the general formula $[(HO)_cR]_bSiR'_a$, wherein R is a trivalent or tetravalent hydrocarbon or hydrocarbon ether radical bonded to the silicon atom via a silicon carbon bond, R' is a monovalent hydrocarbon radical free of aliphatic unsaturation, $a$ is 2 to 3, $b$ is 1 or 2, $c$ is 2 or 3, and all of the hydroxyl groups are primary hydroxyl groups. It is obvious, of course, that the sum of $a+b$ must be equal to 4.

In the above formulae, for example, the $[(HO)_cR]$ group can be, for example, aliphatic radicals such as $(HOCH_2)_2CHCH_2CH_2-$ $(HOCH_2CH_2)(HOCH_2)CHCH_2CH_2CH_2-$ $(HOCH_2CH_2)_3CCH_2CH_2-$ $(HOCH_2CH_2)(HOCH_2)CHCH(CH_2OH)CH_2CH_2CH_2-$ $HOCH_2CH_2CH_2CH_2CH_2CH(CH_2$
$\qquad CH_2OH)CH_2CH_2CH(CH_2CH_3)-$ $(HOCH_2CH_2)_2CHCH_2CH_2-$ $(HOCH_2)_2CHOCH_2CH_2CH_2-$ $(HOCH_2)_2CHOCH_2CH_2-$ $(HOCH_2)(HOCH_2CH_2CH_2CH_2)CHOCH_2CH_2CH_2-$ $(HOCH_2CH_2)_2CHCH_2OCH_2CH_2CH_2-$ or a $(HOCH_2)_2C(CH_3)[CH_2(OCH_2CH_2)_6OCH_2CH_2CH_2-]$ group and cyclic radicals such as

or

In the above formulae the R' groups can be, for example, alkyl groups such as methyl, ethyl, propyl, isopropyl, butyl, isobutyl, amyl, hexyl, heptyl, octyl, nonyl, decyl, dodecyl, pentadecyl, octadecyl; cyclic hydrocarbon groups such as phenyl, tolyl, benzyl, xenyl, naththyl or a cyclohexyl group.

The silanes of this invention can be prepared by any suitable process such as by the addition of the appropriate hydroxy olefinic compound to the appropriate silane containing one or two silicon-bonded hydrogen atoms per silicon atom in the presence of a platinum catalyst. This and other suitable processes by which these silanes can be prepared are well known and will be obvious to those skilled in the art. Illustrative of these processes is the one disclosed in U.S. Patent 2,823,218.

In order that those skilled in the art may better understand how the present invention can be practiced, the following examples are given by way of illustration and not by way of limitation.

Example 1

A mixture of 174 g. of trimethylolpropanemonoallylether and 20 drops of a .1 M chloroplatinic acid solution in butyl acetate was prepared and heated to 110° C. Then 61 g. of phenylmethylsilane was added slowly over a period of about 18 minutes. The reaction was very exothermic so the mixture was externally cooled during the addition to keep the temperature of the mixture in the range from 120–130° C. A grey solution of low viscosity which was a silane of the formula below was obtained.

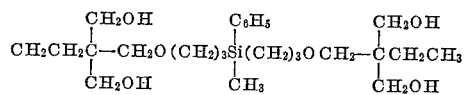

Example 2

When stoichiometric amounts of the following silanes and hydroxy olefinic compounds are reacted employing the process of Example 1, the indicated product is obtained.

A

Silane—$(C_6H_5)_2SiH_2$
Olefin—$(HOCH_2)_3CCH_2OCH_2CH=CH_2$
Product—$(C_6H_5)_2Si[(CH_2)_3OCH_2C(CH_2OH)_3]_2$

B

Silane—$(CH_3)_2(C_3H_7)SiH$
Olefin—$(HOCH_2CH_2CH_2)_2CHO(CH_2)_3OCH_2CH=CH_2$
Product—

$(CH_3)_2(C_3H_7)Si(CH_2)_3O(CH_2)_3$
$\qquad\qquad\qquad\qquad OCH(CH_2CH_2CH_2OH)_2$

C

Silane—$(CH_3)_2SiH_2$
Olefin—$(HOCH_2CH_2)_3CCH=CH_2$
Product—$(CH_3)_2Si[CH_2CH_2C(CH_2CH_2OH)_3]_2$ That which is claimed is:
1. A silane having the general formula $$[(HO)_cR]_bSiR'_a$$

wherein each R is independently selected from the group consisting of trivalent and tetravalent hydrocarbon and hydrocarbon radical free of aliphatic unsaturation, $a$ is atom through a silicon-carbon bond, R' is a monovalent hydrocarbon radical free of aliphatic unsaturation, $a$ is an integer from 2 to 3 inclusive, $b$ is an integer from 1 to 2 inclusive, the sum of $a$ and $b$ being 4, $c$ is an integer from 2 to 3 inclusive, $c$ being 2 when R is trivalent and $c$ being 3 when R is tetravalent, and all of the hydroxyl groups are primary hydroxyl groups.

2. A silane as defined in claim 1 having the general formula $(CH_3CH_2C(CH_2OH)_2CH_2O(CH_2)_3]_bSiR'_a$.

3. A silane as defined in claim 2 wherein $b$ is 1.

4. A silane as defined in claim 2 wherein $b$ is 2.

5. A silane as defined in claim 1 having the general formula $[(HOCH_2)_3CCH_2O(CH_2)_3]_bSiR'_a$.

6. A silane as defined in claim 5 wherein $b$ is 1.

7. A silane as defined in claim 5 wherein $b$ is 2.

8. A silane as defined in claim 4 having the formula $[CH_3CH_2C(CH_2OH)_2CH_2O(CH_2)_3]_2Si(C_6H_5)_2$.

9. A silane as defined in claim 4 having the formula $[CH_3CH_2C(CH_2OH)_2CH_2O(CH_2)_3]_2Si(C_6H_5)_2$.

References Cited

UNITED STATES PATENTS 2,629,727  2/1953  Speier _____ 260—448.2

TOBIAS E. LEVOW, *Primary Examiner.*

J. P. PODGORSKI, *Examiner.*

UNITED STATES PATENT OFFICE
CERTIFICATE OF CORRECTION

Patent No. 3,355,473                      November 28, 1967

Harold A. Clark et al.

It is hereby certified that error appears in the above numbered patent requiring correction and that the said Letters Patent should read as corrected below.

Column 2, line 61, beginning with "radical free" strike out all to and including "hydroxyl groups." in line 68, same column 2, and insert instead -- ether radicals and is bonded to the silicon atom through a silicon-carbon bond, R′ is a monovalent hydrocarbon radical free of aliphatic unsaturation, a is an integer from 2 to 3 inclusive, b is an integer from 1 to 2 inclusive, the sum of a and b being 4, c is an integer from 2 to 3 inclusive, c being 2 when R is trivalent and c being 3 when R is tetravalent, and all of the hydroxyl groups are primary hydroxyl groups. --; column 3, line 6, for "$[CH_3CH_2C(CH_2OH)_2CH_2O(CH_2)_3]_2Si(C_6H_5)_2$" read -- $[CH_3CH_2C(CH_2OH)_2CH_2O(CH_2)_3]_2Si(CH_3)(C_6H_5)$ Signed and sealed this 13th day of May 1969.

(SEAL)
Attest:

EDWARD M. FLETCHER, JR.
Attesting Officer

Commissioner of Patents